R. STOCK, DEC'D.
H. MÜLLER, EXECUTOR.
MOTOR PLOW.
APPLICATION FILED OCT. 19, 1909.

1,152,374.

Patented Aug. 31, 1915.
3 SHEETS—SHEET 3.

UNITED STATES PATENT OFFICE.

ROBERT STOCK, OF BERLIN, GERMANY; HANS MÜLLER, EXECUTOR OF SAID STOCK, DECEASED, ASSIGNOR TO STOCK MOTORPFLUG GESELLSCHAFT MIT BESCHRÄNKTER HAFTUNG, OF BERLIN, GERMANY, A CORPORATION OF GERMANY.

MOTOR-PLOW.

1,152,374.   Specification of Letters Patent.   Patented Aug. 31, 1915.

Application filed October 19, 1909. Serial No. 523,446.

*To all whom it may concern:*

Be it known that I, ROBERT STOCK, a subject of the German Emperor, and resident of Berlin, Germany, have invented certain new and useful Improvements in Motor-Plows, of which the following is a specification.

My invention relates to motor vehicles and particularly to plows, and has for its object to provide a self-propelled plow of simple, compact and comparatively light construction requiring no special skill for its operation.

A motor plow embodying my invention is illustrated in the accompanying drawings, in which—

Figure 1:
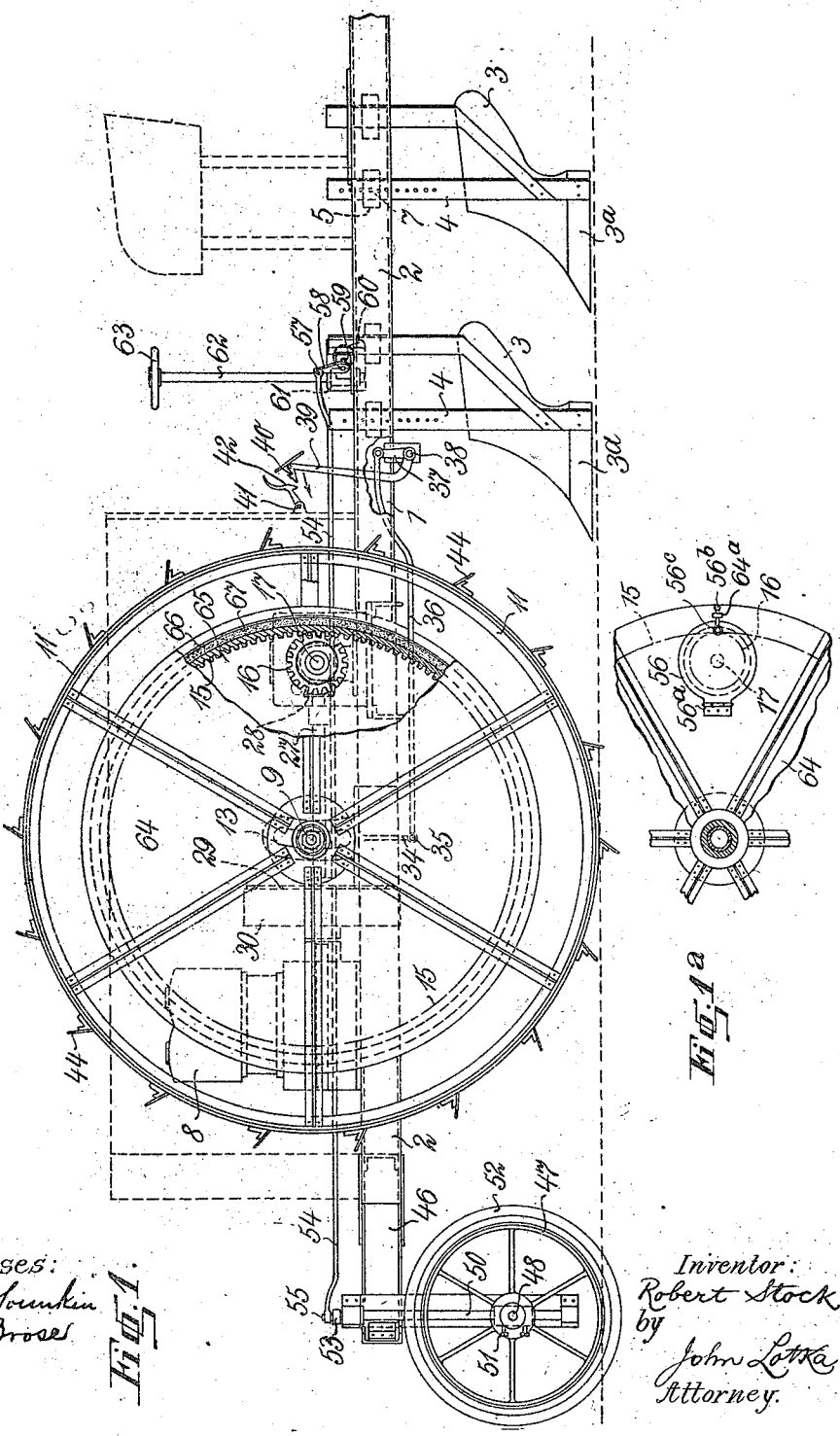
Figure 2:
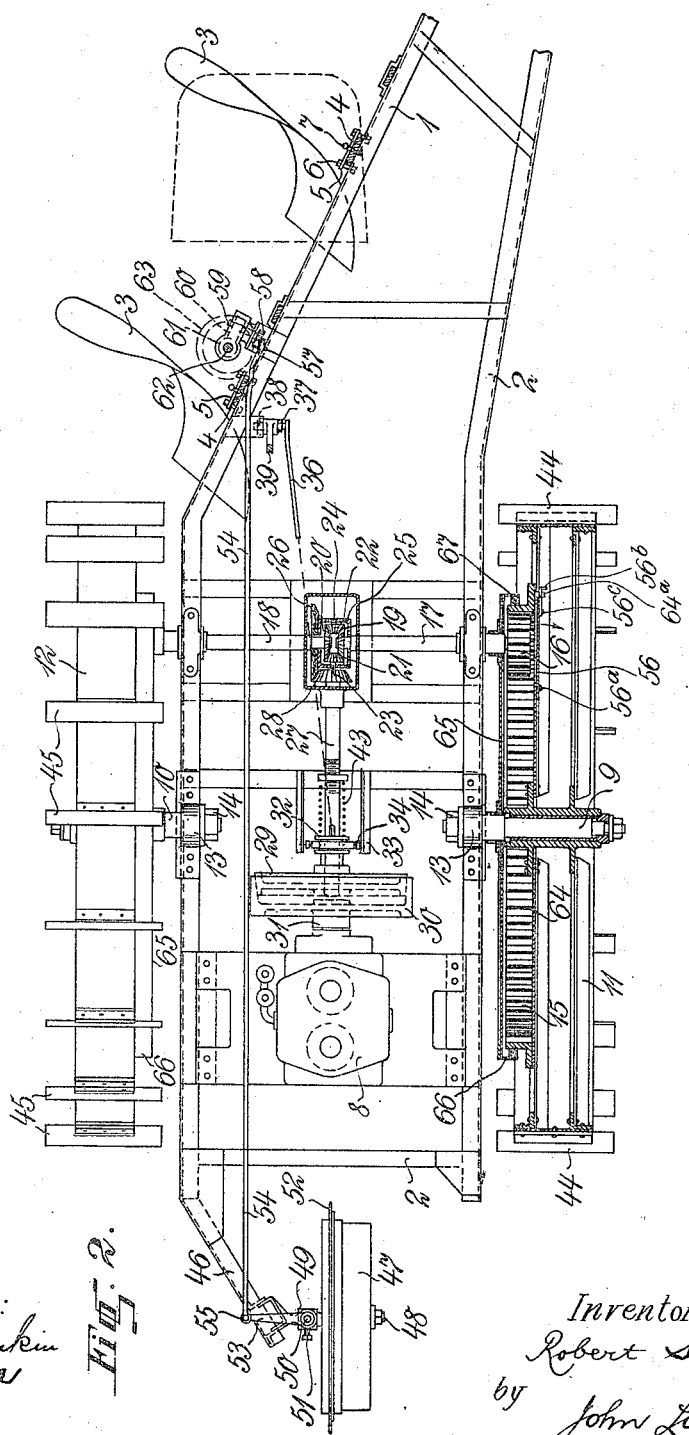
Figure 3:
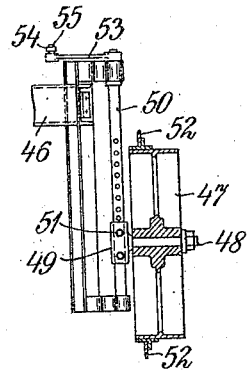
Figure 4:
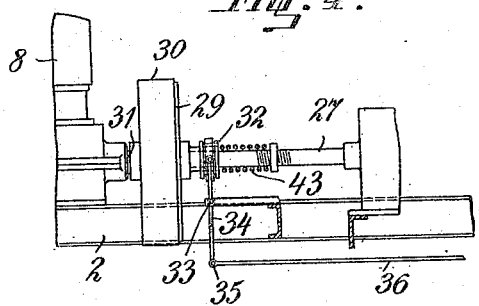

Figure 1 is a side elevation of the plow with parts in section; Fig. 1ª is a detail face view of a cover movable to allow access to one of the gears; Fig. 2 is a plan view of the plow, with parts in section; Fig. 3 is a detail of the steering mechanism, and Fig. 4 is a detail of the connection between motor and drive shaft.

To the oblique beam 1 of the elongated frame 2 are secured the soil-working devices such as plow shares 3, the supports 4 of which are held against said beam by clamping plates 5, connected with the beam by screws 6. The shares may be adjusted up or down and secured in position by pins 7. The lower portions of the shares may be lined in the usual way, as indicated at 3ª.

The frame 2 with the internal combustion engine 8, the shares 3 and the other parts carried by the frame, is balanced relatively to the axles 9, 10 of the drive wheels 11, 12 respectively, that is to say, the weight of the frame and of the parts carried thereby, forward of the axles 9, 10 is approximately the same as the weight of the frame portion and parts carried thereby, in the rear of said axles. I prefer to make each of the axles 9, 10 adjustable independently in curved guides 13 forming part of the frame 2, so that each axle may be adjusted up or down relatively to the frame, or rather vice versa. After adjustment, the parts are held in position as by means of nuts 14. But if desired only one axle may be adjustable in this manner.

The drive wheels 11, 12 are provided with internal gears 15 in mesh with pinions 16 mounted on the transverse alining shafts 17, 18 carrying the bevel pinions 19, 20 respectively of a differential gear of any approved construction. These shafts 17, 18 together with the differential gear connecting them, may be termed a differential shaft. For instance, the pinions 19, 20 may be in mesh with the toothed wheels 21, 22, the axles or shafts 23 and 24 of which are mounted or journaled in the frame 25. The latter is connected rigidly with the bevel wheel 26, through the hub of which the shaft 18 passes loosely. The bevel wheel 26 meshes with a bevel pinion 28 on the drive shaft 27, the motion of which is transmitted differentially (in the well-known way) to the wheels 11 and 12. The guides 13 have their centers of curvature located upon the shafts 17, 18 respectively.

To the shaft 27 is secured a coupling disk 29 adapted to be engaged by an opposing disk 30 secured upon the motor shaft 31. To operate this clutch so as to connect the motor with the drive wheels, or disconnect it therefrom as desired, I have provided a two-armed lever 34, fulcrumed at 33 on the frame 2 and engaging a grooved sleeve 32 rigidly connected with the disk 29. The connection is of a well-known character, allowing the sleeve to turn freely in relation to the lever, but compelling the sleeve and disk to move lengthwise of the shaft 27 when the shifting lever 34 swings on its fulcrum 33. The lever is connected pivotally at 35 with the rod 36, the other end of which has a similar connection with an arm 37 projected from a rock shaft 38 mounted on the frame. This shaft carries an upwardly directed pedal 39 provided with a hook 40 adapted to be engaged and held by a pawl 42 fulcrumed at 41.

If the pedal 39 is moved forward as indicated by the arrow in Fig. 1, the hook 40 will be held by the pawl 42, which drops by gravity. The forward movement of the pedal imparts a like motion to the rod 36 which through the medium of the shifting lever 34 brings the clutch disks 29, 30 out of engagement, thus stopping the progress of the plow. When it is desired to resume plowing, the driver (with his foot) raises the pawl 42, thus releasing the pedal 39 and permitting the coupling disks or clutch disks 29, 30 to be brought into operative engagement by the action of a spring 43.

The drive shaft 27 alines with the motor shaft 31, both extending lengthwise of the vehicle frame. It will be observed (see Fig. 2) that the engine or motor 8 is located forward of the drive wheel axles 9 and 10, while the differential gearing is located in the rear of such axles. I thus not only gain space for the proper placing of the clutch disks 29, 30 and of the mechanism for operating the shifting clutch disk 29, but I further secure a better balancing of the entire structure relatively to the drive wheel axles.

The drive wheels 11, 12 are provided at their peripheries with projections 44, 45 each arranged at an acute angle to the wheel's periphery, measured in a direction contrary to the wheel's forward rotation. The particular construction of these projections forms the subject-matter of another application for Letters Patent filed by me simultaneously herewith, Serial No. 523,448. Their object is to increase the hold or grip of the drive wheels on the soil.

For steering the plow, the following arrangement is shown in the drawings: A steering wheel 47 is located at the forward end portion 46 of the frame 2. The horizontal axle 48 on which the steering wheel turns, is connected rigidly with a sleeve 49 adjustably up and down along the vertical carrier or rock shaft 50 and secured after adjustment by suitable means such as set screws 51. The steering wheel is provided with a sharp circumferential flange 52 exerting the necessary lateral pressure on the soil to enable the plow to be steered readily.

The swinging of the steering wheel is effected by means of an arm 53 extending from the upper end of the rock shaft 50 and pivotally connected at 55 with the steering rod 54. The latter is connected pivotally at its rear end 57 with a crank arm 58 projected from a horizontal shaft 59 journaled in the frame 2. The shaft further carries a worm wheel 60 meshing with a worm 61 on the steering rod 62 provided with the customary hand wheel 63.

The gears 15 secured to the drive wheels 11, 12, and the pinions 16 meshing with said gears, are thoroughly protected from dust by the cover plates 64, 65. The plates 64 are carried by the wheels, being secured rigidly to the spokes, while the plates 65 are relatively stationary, being carried by the axles 9, 10 of the drive wheels, and the shafts 17, 18 of the driving pinions 16 extend through the cover plates 65 and help to keep them in position. Each cover plate 65 has a perpendicular flange 66 projected outward, that is, toward the plate 64, and containing a packing ring 67 of felt or other suitable material engaging the outer surface of the gear 15.

As it may be desirable to have access to the driving pinions 16 without removing the entire plate 64, I may, as shown in Fig. 1$^a$, provide a removable cover section 56 normally closing a suitable opening in the plate 64, said opening being preferably of about the same size as the pinion 16. To prevent loss of the cover, it may be hinged to the plate, as at 56$^a$, and it may be held closed normally by means of a latch 56$^b$, pivoted at 56$^c$ and adapted for engagement with a keeper 64$^a$ on the plate 64.

In operation, the drive wheel 12 will run in the furrow, while the drive wheel 11 and the steering wheel 47 will travel on the unplowed land. The individual adjustability of the drive wheels enables the plow to be readily adapted to various conditions of soil and also to vary the depth of the furrow, which may be further varied by the individual adjustment of the shares 3. The differential gearing allows one drive wheel or the other to receive more power, as may be required by the uneven resistances occurring in practice, and also enables one wheel to rotate independently of the other when the plow is turned about. The vertical adjustment of the steering wheel enables the rear end of the frame, with the plow shares, to be raised out of contact with the ground, as shown in Fig. 1, thus facilitating the travel of the machine over the ground when it is not desired to plow. The balancing of the frame relatively to the axles 9, 10 secures a more uniform running of the plow and reduces the power required for its operation. The clutch 29, 30, being of an elastic character owing to the use of the spring 43, will give in case the shares should strike a heavy stone or other serious obstacle, thus minimizing the danger of breakage. The shares being removable individually, the plow may be operated with a reduced number of shares in very difficult soil.

While I have shown the steering wheel arranged in front, this is by no means essential to my invention.

Various modifications may be made without departing from the nature of my invention as set forth in the appended claims.

I claim as my invention:

1. A motor vehicle comprising a frame, a motor carried thereby, a transverse differential shaft also carried by the frame and adapted to be driven by said motor, and drive wheels connected with said shaft and journaled on the frame independently at points located between the motor and the differential shaft, the weight of the frame portion and of the parts carried thereby, forward of the axes of said wheels, being approximately the same as the weight of the frame portion and of the parts carried thereby, in the rear of said axes.

2. A motor vehicle comprising a frame, a motor thereon, drive wheels journaled on said frame independently, and differential gearing interposed between said motor and the drive wheels, the weight of the frame portion and of the parts carried thereby, forward of the axes of said wheels, being approximately the same as the weight of the frame portion and of the parts carried thereby, in the rear of said axes.

3. A motor vehicle comprising a frame, drive wheels journaled thereon independently, a motor carried by the frame forward of the drive wheels, and a transverse differential shaft carried by the frame in the rear of the drive wheel centers and forming part of an operative connection between said wheels and the motor, the weight of the frame portion and of the parts carried thereby, forward of the axes of said wheels, being approximately the same as the weight of the frame portion and of the parts carried thereby, in the rear of said axes.

4. A motor vehicle comprising a frame, a motor thereon, the shaft of said motor extending lengthwise of the frame, drive wheels journaled on the frame independently in the rear of the motor, a transverse differential shaft for driving said wheels, located in the rear of the wheel centers, a drive shaft actuating said differential shaft and alined with the motor shaft, and clutch mechanism for connecting said alining shafts, the weight of the frame portion and of the parts carried thereby, forward of the axes of said wheels, being approximately the same as the weight of the frame portion and of the parts carried thereby, in the rear of said axes.

In testimony whereof, I have signed this specification in the presence of two subscribing witnesses.

ROBERT STOCK.

Witnesses:
HENRY HASPER,
WOLDEMAR HAUPT.